United States Patent [19]

Driskill

[11] 4,174,935
[45] Nov. 20, 1979

[54] EXTRUSION APPARATUS FOR PRODUCING ELONGATED CORE MEMBERS COVERED WITH CONCENTRIC COATINGS

[75] Inventor: Roger D. Driskill, Seymour, Conn.

[73] Assignee: General Electric Company, New York, N.Y.

[21] Appl. No.: 860,760

[22] Filed: Dec. 14, 1977

[51] Int. Cl.² .............................................. B29C 27/30
[52] U.S. Cl. .................................... 425/113; 425/461; 264/279
[58] Field of Search ................ 425/113, 376, 461–464; 264/279

[56] References Cited

U.S. PATENT DOCUMENTS

| 466,910 | 1/1892 | Royle et al. ......................... 425/113 |
| 1,553,362 | 9/1925 | Calcutt ............................. 425/113 X |
| 1,911,858 | 5/1933 | Trebes ................................ 425/113 |

FOREIGN PATENT DOCUMENTS

| 415674 | 10/1946 | Italy ........................................ 425/113 |
| 549713 | 12/1942 | United Kingdom ..................... 425/113 |

Primary Examiner—Robert L. Spicer, Jr.
Attorney, Agent, or Firm—R. G. Simkins; P. L. Schlamp

[57] ABSTRACT

An extrusion apparatus for the continuous molding of a concentrically formed coating of plastic material around an elongated core member of wire-like body. The extrusion apparatus comprises a guide member for the elongated core member, which is mechanically fixed in coaxial alignment with the extrusion molding die.

10 Claims, 3 Drawing Figures

EXTRUSION APPARATUS FOR PRODUCING ELONGATED CORE MEMBERS COVERED WITH CONCENTRIC COATINGS

BACKGROUND OF THE INVENTION

Extrusion apparatus for the continuous formation or molding of coatings about elongated core members, such as polymeric insulating enclosures or covers on electrical wire or cables, typically comprise one of two types or systems, namely, a cross or transverse-head type of extruder such as shown in U.S. Pat. Nos. 2,185,701; 2,740,988; and 3,581,343; or an in-line type of extruder such as shown in the second stage extruding unit of U.S. Pat. No. 3,979,488 and FIG. 1 of U.S. Pat. No. 3,981,653.

The cross or transverse-head type of extruder, which is most commonly used for insulation coating or covering of wire and cable, consists of an apparatus having a head member or assembly incorporating the mold forming unit or die arranged generally transverse or at a substantial angle such as about 45° to 90°, with respect to the direction or axis of the screw of the main extruder, or of the last extruder unit of a series of a multiple extruder apparatus, and is thus adjoined in an operative relationship with the downstream end or outlet from the screw. Accordingly, the elongated core member or wire to be coated by the extruder apparatus, travels only through the transversely arranged head member or assembly containing the forming unit or die and by-passes the extruder screw.

In the in-line type of extrusion apparatus, the screw of the main extruder or of the last extruder unit of a series of a multiple extruder apparatus, is arranged in substantial axial alignment with the mold forming unit or die, and is provided with a longitudinal bore or passage extending coaxially therethrough and generally coaxially aligned with the orifice of the mold forming unit or die. Thus, the elongated core member or wire to be coated passes through the length of the main extruder screw via the coaxial bore or passage extending therethrough, and continues in the same general direction on through the similarly aligned or substantially coaxial mold forming unit or die for the application of the coating thereabout.

With an in-line type of extrusion apparatus it is particularly difficult, if not substantially impossible, to achieve and/or maintain the continuous molding or forming of a coating or covering body around an elongated core member or wire which is constantly of uniform annular thickness or substantially concentric with the core or wire, because the core member or wire cannot effectively be held precisely central to the die orifice and the inevitable presence or occurrence of disturbing motions or forces. Misaligning conditions for the core member or wire in the in-line type of extruder are primarily attributable to the wobbling or wandering movement of the free downstream end of the rotating extruder screw which is inherent even when the apparatus is maintained at normal tolerances. The wobbling or wandering motion of the screw terminal is imparted to the core member or wire moving therethrough and emerging from the screw's free end just prior to its entering into and moving through the stationary orifice of the mold forming unit or die for the molding formation of the surrounding coating thereabout, whereby concentricity cannot be achieved for significant periods or maintained.

Due to this shortcoming of the in-line type of extruder apparatus for coating wire or the like, the cross or transverse-head type of extruding apparatus is in general more commonly used for coating elongated core members such as forming insulating coverings on electrical wire wherein uniformity of thickness or concentricity is a particularly significant factor. In the usual cross or transverse-head type of extruding apparatus the core member or wire does not encounter the unstable or free end wobbling or wandering movement of the rotating screw, and in traveling generally transverse to the screw while advancing, from a guide into and through the orifice of a mold forming unit or die within the head, the adverse effects of the screw's motion are avoided or bypassed.

However, the cross or transverse-head type of extruder apparatus which is most commonly used for coating wire, also is subject to a potentially serious shortcoming which results in the same impediment as the in-line extruder, namely, the inability to effectively maintain continuous concentricity or uniformity of coating thickness of the extrusion molded covering on the core member or wire. In this type of cross or transverse-head extruder, the problem is attributable to the non-symmetrical or uneven flow passages or courses required to advance the plastic material or molding stock from the transversely disposed extruder screw laterally through a side entry to the transverse-head and therefrom into an annular area surrounding the core member or wire and mold forming unit or die. Such non-symmetrical or uneven flow passages or courses for the supplying of plastic material or molding stock to the transversely arranged mold forming unit or die, and the resulting inevitable differences in flow resistance encountered therein, creates a propensity for uneven or unbalanced rates of flow or movement of the advancing plastic material or molding stock within and through the conduits of the system. Uneven or unbalanced flow or movement of material or stock in turn causes pressure differences or irregularities in and about the mold forming unit or die whereby the advancing core member or wire can be deflected or forced out of alignment with the orifice of the forming unit or die with the result of an uneven coating being formed thereabout which lacks concentricity. For example, note U.S. Pat. Nos. 2,740,988 and 3,608,136, and the complex remedies set forth therein in efforts designed to overcome this shortcoming of cross or transverse-head type extruding apparatus.

Moreover, the non-symmetrical or uneven flow passages or courses of the cross or transverse-head type of extruder apparatus can be the source of other problems or difficulties. For instance, when extrusion molding with stocks of heat curable polymeric molding compounds, the non-symmetrical or uneven flow passages or courses of this type of apparatus produce variant or inconsistent residency periods and temperature conditions within the mass of heat sensitive molding stock as it advances through the apparatus, causing premature or irregular curing therethrough. Also, molding stock is more prone to become static or retained within this type of apparatus for indeterminate periods of time whereby it can reach such an advanced stage of heat curing that it is no longer sufficiently plastic to be miscible with the balance of the more plastic and yet uncured stock. An advanced stage of cure in portions of the molding stock and a lack of uniform miscibility of the stock disrupts the uniform or smooth continuous flow thereof through the die or mold forming device, and thereby causes imperfections and/or discontinuities within the product molded therefrom as well as a lack of physical homogeneity therein.

SUMMARY OF THE INVENTION

This invention comprises a novel and improved extrusion apparatus for the continuous molding or shaping of a concentrically formed, uniform coating of plastic material surrounding an elongated core member such as wire or cable. The new extrusion apparatus of this invention comprises structural means for overcoming non-concentric coating of elongated core members or wire by precluding any misaligning movement or defections of the elongated core member or wire as it enters into and passes through the orifice of the mold forming unit or die, including a guide member mechanically affixed to the mold forming unit or die structure.

OBJECTS OF THE INVENTION

It is a primary object of this invention to provide an improved extrusion apparatus for the continuous forming of a concentric coating layer of plastic material around an elongated core member or body.

It is also an object of this invention to provide a new and improved continuous extrusion apparatus of uncomplicated construction which expeditiously and uniformly handles and conveys heat sensitive or curable plastic molding compounds therethrough and forms around elongated core members coatings of consistently uniform or even thickness.

It is another object of this invention to provide an extrusion apparatus which is neither costly nor complex in its construction or assembly, is easy to operate and maintain, and which continuously forms a concentric coating of even thickness around elongated core members such as wire and cable.

It is a further object of this invention to provide an improved plastic extrusion apparatus for the continuous working and plasticizing of polymeric insulating compounds, the continuous advancement and feeding of the worked and plasticized polymeric insulation compound, and the continuous extrusion molding or forming of the worked and plasticized polymeric insulation compound in a concentric layer around a wire or cable electrical conductor in a coating of uniform thickness.

Figure 1:
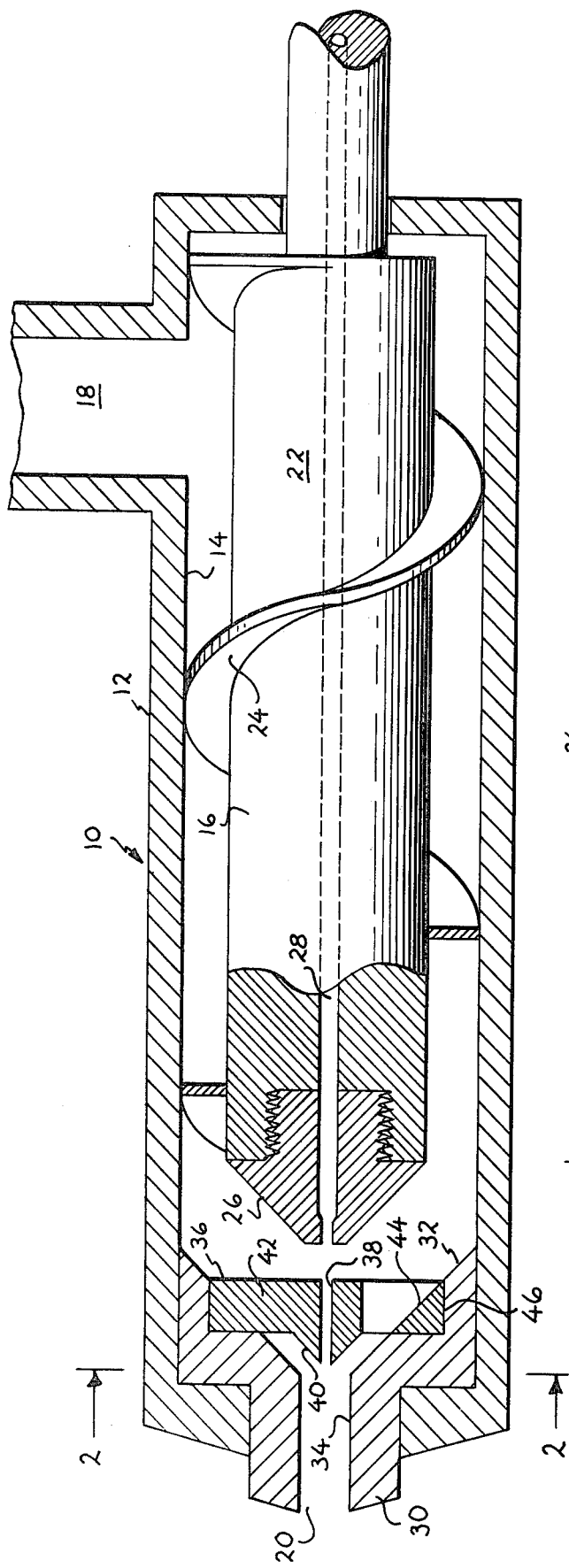
FIG. 1 is a cross-sectional view of the extrusion apparatus of this invention.
Figure 3:
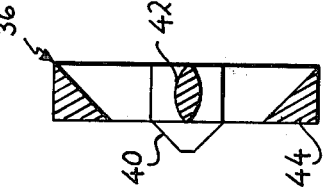
FIG. 3 is a cross-sectional view of the guide member taken from lines 3—3 of FIG. 2.
Figure 2:
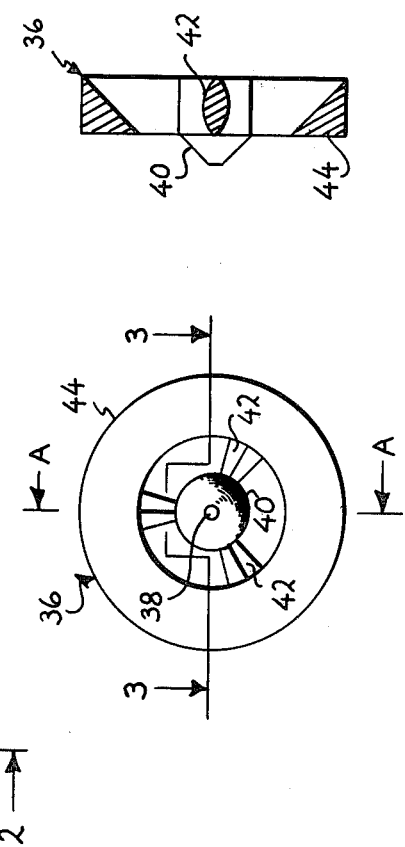
FIG. 2 is an end view of the guide member shown in cross-section in FIG. 1, and taken from lines 2—2.

The guide member shown in cross-section in FIG. 1 is taken from lines A—A of FIG. 2.

DETAILED DESCRIPTION OF A PREFERRED EMBODIMENT

In accordance with the present invention, an extrusion apparatus is provided which continuously produces a concentric coating of plastic molding stock in uniform thickness around elongated core members such as wire or cable.

Referring to the drawing, the extruder apparatus 10, includes a housing with a cylindrical chamber 12 forming an extruder barrel 14, and an extruder screw 16 positioned in the barrel.

The extruder barrel 14 is provided with an inlet port 18 adjacent to the extruder's upstream end for the introduction and feeding of molding stock, and an egress or outlet passage 20 at the downstream end of the barrel for the discharge of material therefrom. Passage 20 is of greatly restricted cross-sectional area in relation to the extruder barrel, and is generally concentrically positioned with respect to the longitudinal axis of cylindrical chamber forming the extruder barrel 14.

The extruder screw 16, comprises a shaft 22 provided with one or more helical ribs 24 which form a helical channel therebetween extending substantially along the length of the screw shaft 22 for the working and movement of the molding stock in a helical path around the screw and its continuous advancement along the length of the extruder chamber 12 or barrel 14 from the inlet port 18 to the outlet passage 20. The extruder screw 16 generally extends substantially through the length of the extruder from upstream of the feed inlet port 18 substantially to the downstream outlet passage, and can be rotated by any apt means such as an electric or hydraulic motor, not shown, in a conventional manner. Also, the extrusion screw may be mounted so as to be axially movable within the cylindrical chamber 12 whereby the distance between the end of the screw and the downstream end of the barrel 14 containing the outlet passage 20 can be regulated if apt.

The extruder screw shaft 22 is provided on its downstream end with a head member 26 having a generally conically converging or tapered end portion. Screw shaft 22 and the head member 26 therefor are provided with an internal central bore 28 extending longitudinally coaxially through the length thereof for the continuous feeding and passage therethrough of an elongated core member such as wire or cable for the continuous extrusion coating or molding thereabout of a covering layer such as a polymeric insulation.

The downstream end of the extruder housing 12 forming the extruder barrel 14 is provided with a die block 30 or structure comprising the mold forming unit or die member. Die block 30, which may be constructed of a single monolithic unit as shown, or a composite assembly or components, includes a generally conically converging or tapered entry portion 32 proving a funnel-like section leading to and converging toward the orifice comprising the extrusion mold forming unit or die 34. The orifice of the mold forming unit or die 34 is substantially coaxially aligned with the internal central bore 28 of the extrusion screw 16, and it connects or communicates with the egress or outlet passage 20 of the extruder.

A guide member 36 is interposed between the end or head member 26 of the screw 16 and the extrusion mold forming unit or die 34, positioned in close proximity upstream of the orifice of mold forming unit or die 34, and affixed to the die block 30 in a rigid or immovable relationship therewith such as by mounting on the die block 30, for example seated in a recess as shown, or through apt connecting mechanical structure which securely maintains its relative immobility. Guide member 36 is provided with a central orifice 38 which is of a sufficient or apt cross-sectional dimension and length to closely embrace the elongated core member, such as a wire or cable, over an extended length thereof so as to accommodate its easy passage therethrough and also to restrain lateral movement or deflection thereof upon entry into the orifice of the mold forming unit or die 34. Central orifice 38 of the guide member 36 is in co-axial alignment with the orifice of the mold forming unit or die 34 whereby the elongated core member or wire moving through and emerging from bore 28 of screw 16 is accurately and securely positioned and aligned upon passing through the orifice 38 of the guide member 36 and thus held in central or coaxialy relationship with respect to the orifice of the mold forming unit or die 34 immediately prior to its entry into and movement therethrough for the formation of a covering of plastic molding stock concentrically and evenly thereabout.

In a preferred embodiment the orifice 38 of guide member 36 is provided in a generally annular body or hub 40 which is preferably elongated relative to the diameter of its orifice or tubular, and is supported by a plurality of radial extending legs or spokes 42, in a spider-type arrangement, extending to a supporting or mounting base ring or rim 44 for the secure and rigid positioning of the guide member. The annular body 40 is preferably tapered or conical shaped, torpedo-like, at its downstream end, and the legs provided with tapered or stream-lined edges both upstream and downstream so as not to impede or disrupt substantially the even and balanced flow of the advancing plastic molding material uniformly to and through the head member. Also, the supporting or mounting base 44, of the guide member is preferably annular as shown in the drawing, and of a cross-sectional configuration which compliments the flow surface contour of head member 32 in order not to impede or disrupt the flow of material. For instance, the mounting base 44 of the guide member 36 can be contoured to be countersunk within a mounting recess 46 in the entry portion 32 and thereby having an exposed flow surface and shape corresponding substantially to that of the adjoining flow surface of the head member as shown in the drawing.

In operation, a molding stock such as heat curable polymeric insulating compound is fed into the cylindrical chamber 12 via inlet port 18 wherein the stock is constantly worked or plasticized and continuously advanced along through the length of the extruder 10 from the upstream end to the downstream end and out through the outlet passage 20 by the rotation of the extruder screw 16. Simultaneously therewith an elongated core member such as a wire for producing an insulated electrical conductor is continuously advanced through the internal central bore 28 of the screw shaft 22 and head member 26, then on through the orifice 38 of guide member 36 whereupon the moving wire is accurately centered and held in a coaxial relationship with the orifice of the mold forming unit or die 34 just previous to its entry and movement therethrough.

Accordingly, the continuously advancing plasticized molding stock of an electrical insulating compound moves in an even and balanced or unperturbed flow pattern into the die entry 32 and uniformly on into the orifice of die 34 around the continuously advancing, coaxially aligned wire whereby a concentric coating of the plasticized molding stock is continuously molded or formed thereabout in an even layer of uniform thickness.

Although the invention has been described with reference to certain specific embodiments thereof, numerous modifications are possible and it is desired to cover all modifications falling within the spirit and scope of this invention.

I claim:

1. An extruder for the continuous forming of a concentric coating of heat curable plastic material around an elongated core member, comprising an extruder housing having an inlet located in an upstream portion and an outlet located in a downstream end thereof, a rotatable extrusion screw extending from upstream of the inlet substantially through the length of the extruder housing towards the downstream outlet having a free downstream end and conically converging end portion, said rotatable screw being provided with a longitudinal coaxial bore extending the length thereof, the outlet in the downstream end of the housing comprising a forming die orifice provided with a converging entry surface leading into the forming die orifice, and an annular guide means spaced from said free end of the extrusion screw concentrically aligned with the forming die orifice mounted in fixed mechanical relationship with the converging entry to the die orifice in close proximity to the die orifice and contoured to compliment the surface of the converging entry to the die orifice.

2. An extruder for the continuous forming of a concentric coating of heat curable plastic material around an elongated core member, comprising a cylindrical extruder housing having an inlet for the supplying of plastic molding stock located in an upstream portion thereof and an outlet for the discharge of molded plastic material located in a downstream end thereof, a rotatable extrusion screw extending from upstream of the inlet substantially through the housing towards the outlet having a free downstream end and conically converging end portion for the advancement of plastic molding stock through the housing, said rotatable screw being provided with a longitudinal coaxial bore extending the length thereof for the passage therethrough of an elongated core member for coating, the outlet in the downstream end of the housing comprising a forming die orifice provided with a symmetrically converging entry surface leading into the forming die orifice for channeling the advancing plastic molding stock into the die orifice, and an annular guide means spaced from said free end of the extrusion screw concentrically aligned with the die orifice mounted in rigid mechanical relationship with the converging entry of the die orifice for guiding an elongated core member concentrically into the die orifice for molding a concentric coating thereabout in close proximity to the die orifice and contoured to compliment the surface of the converging entry to the die orifice.

3. The extruder of claim 2, wherein the guide means comprises an annular guide supported by a plurality of legs extending radially therefrom to a base ring.

4. An extruder for the continuous forming of a concentric coating of heat curable plastic material around an elongated core member, comprising an extruder housing having an inlet located in an upstream portion and an outlet located in a downstream end thereof, a rotatable extrusion screw extending from upstream of the inlet substantially through the housing towards the outlet having a free downstream end and conically converging end portion, said rotatable screw being provided with a longitudinal coaxial bore extending the length thereof, a die block unit positioned in the downstream end or the extruder housing incorporating the outlet, said die block unit comprising a forming die orifice communicating with the outlet and a converging entry surface leading into the forming die orifice, and an annular guide means spaced from said free end of the extrusion screw concentrically aligned with the die orifice mounted in the die block unit in close proximity to the die orifice and contoured to compliment the surface of the converging entry to the die orifice.

5. The extruder of claim 4, wherein the guide means comprises an annular guide supported by a plurality of legs extending radially therefrom to a base ring.

6. An extruder for the continuous forming of a concentric coating of heat curable plastic material around an elongated core member, comprising an extruder housing having an inlet for the supplying of plastic molding stock located in an upstream portion thereof and an outlet for the discharge of molded plastic material located in a downstream end thereof, a rotatable extrusion screw extending from upstream of the inlet substantially through the housing towards the outlet having a free downstream end and conically converging end portion for the advancement of plastic molding stock through the housing, said rotatable screw being provided with a longitudinal coaxial bore extending the length thereof for the passage therethrough of an elongated core member for molding of a coating thereabout, a die block unit positioned in the downstream end of the extruder housing incorporating the outlet, said die block unit comprising a forming die orifice communicating with the outlet and a symmetrically converging entry surface leading into the forming die orifice for channeling the advancing plastic mold stock into the die orifice and through the outlet, and a tubular guide means spaced from said free end of the extrusion screw concentrically aligned with the die orifice mounted in a recess in the die block unit in rigid mechanical relationship therewith in close proximity to the die orifice and contoured to compliment the surface of the converging entry to the die orifice for guiding an elongated core member concentrically into and through the die orifice for molding a concentric coating of plastic molding stock thereabout.

7. The extruder of claim 6, wherein the guide means comprises a tubular guide supported by a plurality of legs extending radially therefrom to a base ring positioning in said recess in the die block unit.

8. An extruder for the continuous forming of a concentric coating of heat curable plastic electrical insulating material around a wire for an electrical conductor, comprising an extruder housing having an inlet located in an upstream portion and an outlet located in an upstream portion and an outlet located in a downstream end thereof, a rotatable extrusion screw extending from upstream of the inlet substantially through the housing towards the outlet having a free downstream end and a conically converging end portion, said rotatable screw being provided with a longitudinal coaxial bore extending the length thereof, a die block unit positioned in the downstream end of the extruder housing incorporating the outlet, said die block unit comprising a forming die orifice communicating with the extruder outlet and a symmetrically converging entry surface leading into the forming die orifice, and a tubular guide means spaced from said free end of the extrusion screw for embracing a wire conductor concentrically aligned with the die orifice and mounted in the die block unit in rigid mechanical relationship therewith in close proximity to the die orifice and contoured to compliment the surface of the converging entry to the die orifice.

9. The extruder for insulation coating of wire of claim 8, wherein the guide means comprises a tubular guide supported by a plurality of legs extending radially therefrom to a ring base mounted in the die block unit.

10. An extruder for the continuous forming of a concentric coating of heat curable plastic electrical insulating material around a wire for an electrical conductor, comprising a cylindrical extruder housing having an inlet for the supplying of insulating plastic molding stock located in an upstream portion and an outlet for the discharge of molded plastic insulating material located in a downstream end thereof, a rotatable extrusion screw extending from upstream of the inlet substantially through the housing towards the outlet having a free downstream end and a conically converging end portion for the advancement of insulating plastic molding stock through the housing to the outlet, said rotatable screw being provided with a longitudinal coaxial bore extending the length thereof for the passage therethrough of a wire for molding of an insulating coating thereabout, a die block unit positioned in the downstream end of the extruder housing incorporating the outlet, said die block unit comprising a forming die orifice communicating with the extruder outlet and a symmetrically converging entry surface leading into the forming die orifice for channeling the advancing insulating plastic molding stock into the die orifice and through the outlet, and an annular guide means spaced from said free end of the extrusion screw concentrically aligned with the die orifice for embracing and guiding a wire concentrically into and through the die orifice for molding a concentric coating of insulating plastic molding stock thereabout, said guide means comprising a tubular guide supported by a plurality of legs extending radially therefrom to a ring base mounted within a recess in the converging entry leading to the die orifice of the die block in close proximity to the die orifice and contoured to compliment the surface of the converging entry to the die orifice.

* * * * *